United States Patent [19]

Calabro

[11] Patent Number: 5,279,810
[45] Date of Patent: Jan. 18, 1994

[54] METHOD OF PREPARING SILICOALUMINOPHOSPHATE COMPOSITIONS USING A REAGENT CONTAINING BOTH PHOSPHORUS AND SILICON REACTIVE SITES IN THE SAME MOLECULE

[75] Inventor: David C. Calabro, Somerset, N.J.

[73] Assignee: Mobil Oil Corporation, Fairfax, Va.

[21] Appl. No.: 631,115

[22] Filed: Dec. 20, 1990

[51] Int. Cl.$^5$ .............................................. C01B 33/34
[52] U.S. Cl. .............................. 423/701; 423/DIG. 30
[58] Field of Search ............... 423/325, 326, 328, 329, 423/701, DIG. 30; 502/214, 162; 556/9

[56] References Cited

U.S. PATENT DOCUMENTS

| | | | |
|---|---|---|---|
| 4,143,057 | 3/1979 | Weinberg et al. | 502/162 |
| 4,440,871 | 4/1984 | Lok et al. | 423/305 |
| 4,673,559 | 6/1987 | Derouane et al. | 423/306 |
| 4,891,197 | 1/1990 | Derouane et al. | 423/306 |

*Primary Examiner*—R. Bruce Breneman
*Attorney, Agent, or Firm*—Alexander J. McKillop; Dennis P. Santini; Laurence P. Hobbes

[57] ABSTRACT

A method of preparing silicoaluminophosphate (SAPO) compositions from a forming mixture which comprises sources of oxides of silicon, aluminum and phosphorus wherein the oxides of silicon and phosphorus are provided at least in part by a reagent containing both phosphorus and silicon reactive sites in the same molecule; and maintaining the forming mixture under conditions sufficient to form said compositions. The reagent is preferably a phosphonate-functionalized organosiliconate such as diethylphosphatoethyltriethoxysilane.

5 Claims, No Drawings

METHOD OF PREPARING SILICOALUMINOPHOSPHATE COMPOSITIONS USING A REAGENT CONTAINING BOTH PHOSPHORUS AND SILICON REACTIVE SITES IN THE SAME MOLECULE

This invention relates to a method of preparing silicoaluminophosphates using a reagent containing a phosphorus reactive site and a silicon reactive site in the same molecule. More particularly, this invention relates to an improved method of preparing silicoaluminophosphate compositions wherein phosphonate-functionalized organosiliconates are used as a source of silicon and phosphorus atoms in the forming mixture whereby the incorporation of silicon into the growing aluminophosphate framework is facilitated by virtue of the organosiliconate providing silicon directly attached to a source of framework phosphorus.

Partial substitution of silicon for phosphorus in aluminophosphate frameworks in order to generate catalytically active acid sites has been a longstanding goal of molecular sieve science. For the most part, significant catalytic activity has not been achieved. This may result from the bulk silicon content being present as coprecipitated silica, or, as silicon-rich islands within the framework affording few active Si—O—Al interactions. The present invention avoids such conditions by utilizing as a source of framework silicon, phosphonate-functionalized organosiliconates which contain a Si—C bond which is believed to suppress self-condensation and concomitant silicon-rich oxide phases.

Crystalline, microporous silicoaluminophosphates are described in the Lok et al U.S. Pat. No. 4,440,871, the entire disclosure of which is expressly incorporated herein by reference.

The present invention provides a method of preparing a silicoaluminophosphate composition comprising crystals having a framework topology from a forming mixture which method comprises (i) preparing a mixture capable of forming said composition, said mixture comprising a source or sources of (a) an oxide of silicon, (b) an oxide of aluminum, and (c) an oxide of phosphorus, wherein said source or sources of (a) and (c) include(s) a reagent containing both phosphorus and silicon reactive sites in the same molecule; and (ii) maintaining said mixture under conditions sufficient to form said composition.

The reagent molecule preferably contains a silicon to carbon bond between a silicon atom and a phosphorus atom; in other words, the molecule contains at least one carbon atom between a silicon atom and a phosphorus atom. The molecule preferably contains a phosphorus alkoxide reactive site and/or a silicon alkoxide reactive site. An example of such a reagent is a phosphonate-functionalized organosiliconate, e.g., dialkylphosphatoalkyltrialkoxysilane, diethylphosphatoethyltriethoxysilane being particularly preferred.

Other reagents containing both phosphorus and silicon reactive sites in the same molecule and suitable for use in the present invention include those disclosed in U.S. Pat. No. 4,143,057 to Weinberg et al, the contents of which are expressly incorporated herein by reference. Specific compounds disclosed in the reference include diethoxyphosphorylethylmethyl diethoxysilane, diethoxyphosphorylethyl heptamethyl cyclotetrasiloxane, diethoxyphosphorylethylmethy diethoxysilane, diethoxyphosphorylisopropyl triethoxysilane, diethoxyphosphorylethyl methyl di(trimethylsiloxy)silane, heptamethyl diethoxyphosphorylethyl cyclotetrasiloxane, 1,3,5,7-tetramethyl 1,3,5,7-tetra(diethoxyphosphorylethyl)cyclotetrasiloxane, and 1,1,3,3-tetramethyl-1,3-di(ethoxyphosphorylethyl)disiloxane.

Silicoaluminophosphates are generally prepared from a forming mixture containing sources of oxides of silicon, aluminum and phosphorus. The forming mixture may be an aqueous and/or organic medium. The mixture may also contain an organic templating agent as known in the silicoaluminophosphate synthesis art, e.g., tetraalkylammonium ion. Examples of such templating agents include tetramethylammonium hydroxide (TMAOH), tetraethylammonium hydroxide (TEAOH), and tetrapropylammonium hydroxide (TPAOH).

Sources of aluminum oxide include, as non-limiting examples, any known form of aluminum oxide or hydroxide, organic or inorganic salt or compound. Sources of silicon oxide besides those specified as required by the present invention include, as non-limiting examples, any known form of silicic acid or silicon dioxide, alkoxy or other compounds of silicon. Sources of phosphorus oxide include, as non-limiting examples, any known form of phosphorus acids or phosphorus oxides, phosphates and phosphites, and organic derivatives of phosphorus. Further details relating to formation of the forming mixtures for silicoaluminophosphate compositions, including molar amounts of each oxide source can be found in the aforementioned U.S. Pat. No. 4,471,440.

Crystallization conditions for the forming mixture generally include maintaining the mixture at temperatures of at least 100° C. for a time sufficient to effect crystallization. Further details regarding crystallization conditions can be found in U.S. Pat. No. 4,471,440.

EXAMPLE 1

With stirring, a 400 mL beaker was charged with 6.7 g of distilled water, 10.7 g of 85% phosphoric acid and 6.4 g of Catapal B ™ alumina. In a separate beaker were combined 13 g of distilled water, 6.6 g of diethylphosphatoethyltriethoxysilane and 34.3 g of 40% tetraethylammonium hydroxide. The two mixtures were combined, stirred to homogenize and charged to a static bomb for crystallization at 220° C. for 20 h. The product mixture was decanted, washed with water and dried to yield 3.2 g of product containing 3.44 wt % Si.

The x-ray diffraction pattern of the above product exhibits the lines given in Table I. The major lines in this pattern are in agreement with those of SAPO-34 (as disclosed in U.S. Pat. No. 4,440,871). Additional weak diffraction lines at 7.5° and 17° 2theta are indicative of SAPO-5 and unidentified material respectively.

EXAMPLE 2 (COMPARATIVE)

This reaction mixture was prepared at double the scale of Example 1 with the substitution of 2.5 g of Cabosil ™ fumed silica in place of the silane reagent. This mixture was crystallized in a static bomb at 220° C. for 38 h to yield 10.3 g of product containing 4.46 wt % Si. The x-ray diffraction lines of this SAPO-34 product are given in Table II.

EXAMPLE 3

In a 250 ml beaker were combined 7.3 g of distilled water, 7.0 g of diethylphosphatoethyltriethoxysilane, 6.9 g of Catapal B ™ alumina and 10.9 g of 85% phosphoric acid. This mixture was stirred to homogenize. In a separate beaker were combined 36.1 g of 40% tetraethylammonium hydroxide and 14.1 g of distilled water. The two mixtures were combined, stirred to homogenize and charged to a 300 ml stirred autoclave where it was crystallized at 235° C. for 20 h. This preparation yielded 7.1 g of product containing 4.4 wt % Si. The x-ray diffraction pattern of this product (Table III) is very similar to that of Example 1 save for the absence of the SAPO-5 impurity.

The $^{29}$Si NMR spectra of the products from Examples 1-3 indicate the presence of both framework and non-framework silicon. In all three samples the most intense resonance appears at −92 ppm indicating that a majority of the silicon contained in these products is in the framework.

EXAMPLE 4

A 100 ml round bottom flask was charged with 24.7 g of distilled water, 16.9 g of 85% phosphoric acid and 19.1 g of diethylphosphatoethyltriethoxysilane. This mixture was distilled to a temperature of 95° C. in order to remove ethanol which is a byproduct of the silane hydrolysis. The resulting mixture was then charged with 13.6 g of Catapal B ™ alumina, 32.5 g of 40% tetraethylammonium hydroxide and 40 g of distilled water. This reaction mixture was crystallized in a static bomb at 220° C. for 64 h to yield 10.5 g of product containing 4.32 wt % Si.

EXAMPLE 5

A reaction mixture identical to that of Example 4 was crystallized in a stirred autoclave at 220° C. for 57 h to yield 7.3 g of product containing 1 wt % Si.

EXAMPLE 6

A 100 ml round bottom flask was charged with 24.9 g of distilled, water, 17.1 g of 85% phosphoric acid and 19.3 g of diethylphosphatoethyltriethoxysilane. This mixture was distilled to 95° C., then charged with 13.6 g of Catapal B ™ alumina, 32.6 g of 40% tetraethylammonium hydroxide and 40 g of distilled water. This reaction mixture was crystallized in a static bomb at 150° C. for 63 h to yield 5 g of product containing 1.72 wt % Si.

The results of x-ray diffraction analysis of the products from Examples 4-6 are shown in Tables IV-VI. These results are in agreement with the reported diffraction patterns of SAPO-5 in U.S. Pat. No. 4,440,871. The product of Example 4 also contains a small amount of impurity.

Elemental analysis of the products of the above examples indicated a silicon content of 0.5 to 4.8%. $^{29}$Si NMR analysis indicated that the majority of the silicon was present in the framework with chemical shift values of 90-93ppm. These data indicate that significant levels of silicon can be incorporated into aluminophosphate frameworks using organosiliconates.

TABLE I

X-RAY DIFFRACTION PATTERN OF EXAMPLE 1 PRODUCT
WAVELENGTH IN USE:
1.54184 AVERAGE BACKGROUND NOISE (CPM) = 54

| # | 2THETA | D | CPM | ESD | # | 2THETA | D | I | APPR. AREA |
|---|--------|---|-----|-----|---|--------|---|---|------------|
| 1 | 7.472 | 11.8315 | 123 | 92 | 2 | 9.559 | 9.2520 | 100 | 206 |
| 2 | 9.559 | 9.2520 | 1008 | 255 | 7 | 20.659 | 4.2994 | 41 | 85 |
| 3 | 12.920 | 6.8519 | 88 | 72 | 4 | 16.060 | 5.5186 | 36 | 73 |
| 4 | 16.060 | 5.5186 | 360 | 153 | 12 | 30.639 | 2.9179 | 15 | 31 |
| 5 | 16.960 | 5.2279 | 137 | 102 | 13 | 30.758 | 2.9069 | 15 | 31 |
| 6 | 19.865 | 4.4695 | 110 | 85 | 5 | 16.960 | 5.2279 | 13 | 27 |
| 7 | 20.659 | 4.2994 | 416 | 164 | 15 | 31.248 | 2.8624 | 13 | 27 |
| 8 | 22.503 | 3.9512 | 106 | 79 | 11 | 26.015 | 3.4252 | 12 | 25 |
| 9 | 25.318 | 3.5178 | 75 | 70 | 1 | 7.472 | 11.8315 | 12 | 21 |
| 10 | 25.468 | 3.4974 | 77 | 71 | 14 | 31.109 | 2.8749 | 12 | 24 |
| 11 | 26.015 | 3.4252 | 126 | 94 | 6 | 19.865 | 4.4695 | 11 | 22 |
| 12 | 30.639 | 2.9179 | 154 | 97 | 8 | 22.503 | 3.9512 | 10 | 18 |
| 13 | 30.758 | 2.9069 | 153 | 102 | 3 | 12.920 | 6.8519 | 8 | 17 |
| 14 | 31.109 | 2.8749 | 120 | 87 | 10 | 25.468 | 3.4974 | 7 | 15 |
| 15 | 31.248 | 2.8624 | 134 | 89 | 9 | 25.318 | 3.5178 | 7 | 15 |

TABLE II

X-RAY DIFFRACTION PATTERN OF EXAMPLE 2 PRODUCT
WAVELENGTH IN USE:
1.54184 AVERAGE BACKGROUND NOISE (CPM) = 87

| # | 2THETA | D | CPM | ESD | # | 2THETA | D | I | APPR. AREA |
|---|--------|---|-----|-----|---|--------|---|---|------------|
| 1 | 9.559 | 9.2520 | 1595 | 317 | 1 | 9.559 | 9.2520 | 106 | 285 |
| 2 | 12.900 | 6.8624 | 205 | 111 | 6 | 20.636 | 4.3041 | 102 | 315 |
| 3 | 14.094 | 6.2836 | 162 | 102 | 4 | 16.063 | 5.5178 | 63 | 171 |
| 4 | 16.063 | 5.5178 | 958 | 249 | 9 | 30.613 | 2.9204 | 30 | 93 |
| 5 | 18.012 | 4.9249 | 207 | 112 | 10 | 31.274 | 2.8601 | 21 | 66 |
| 6 | 20.626 | 4.3041 | 1540 | 312 | 8 | 25.923 | 3.4371 | 20 | 47 |
| 7 | 25.255 | 3.5265 | 279 | 130 | 7 | 25.255 | 3.5265 | 18 | 56 |
| 8 | 25.923 | 3.4371 | 311 | 139 | 5 | 18.012 | 4.9249 | 13 | 42 |
| 9 | 30.613 | 2.9204 | 456 | 161 | 2 | 12.900 | 6.8624 | 13 | 4 |
| 10 | 31.274 | 2.8601 | 322 | 135 | 3 | 14.094 | 6.2836 | 10 | 33 |

TABLE III

X-RAY DIFFRACTION PATTERN OF EXAMPLE 3 PRODUCT
WAVELENGTH IN USE:
1.54184 AVERAGE BACKGROUND NOISE (CPM) = 44

| # | 2THETA | D | CPM | ESD | # | 2THETA | D | I | APPR. AREA |
|---|--------|---|-----|-----|---|--------|---|---|------------|
| 1 | 9.512 | 9.2978 | 944 | 237 | 1 | 9.512 | 9.2978 | 104 | 193 |
| 2 | 12.888 | 6.8689 | 69 | 73 | 6 | 20.615 | 4.3084 | 39 | 73 |
| 3 | 15.603 | 5.6793 | 79 | 62 | 4 | 16.022 | 5.5317 | 35 | 64 |
| 4 | 16.022 | 5.5317 | 315 | 149 | 5 | 16.959 | 5.2282 | 22 | 40 |
| 5 | 16.959 | 5.2282 | 199 | 110 | 15 | 30.769 | 2.9059 | 13 | 26 |
| 6 | 20.615 | 4.3084 | 357 | 144 | 17 | 31.105 | 2.8753 | 13 | 25 |
| 7 | 25.209 | 3.5328 | 54 | 58 | 14 | 30.642 | 2.9176 | 12 | 22 |
| 8 | 25.476 | 3.4963 | 52 | 58 | 16 | 30.931 | 2.8910 | 11 | 21 |
| 9 | 25.910 | 3.4387 | 97 | 74 | 9 | 25.910 | 3.4387 | 10 | 19 |
| 10 | 26.148 | 3.4079 | 75 | 77 | 3 | 15.603 | 5.6793 | 8 | 16 |
| 11 | 26.299 | 3.3888 | 69 | 57 | 10 | 26.148 | 3.4079 | 8 | 13 |
| 12 | 29.983 | 2.9803 | 57 | 48 | 13 | 30.243 | 2.9552 | 7 | 14 |
| 13 | 30.243 | 2.9552 | 71 | 65 | 11 | 26.299 | 3.3888 | 7 | 7 |
| 14 | 30.642 | 2.9176 | 112 | 81 | 2 | 12.888 | 6.8689 | 7 | 1 |
| 15 | 30.769 | 2.9059 | 125 | 85 | 12 | 29.983 | 2.9803 | 6 | 11 |
| 16 | 30.931 | 2.8910 | 107 | 83 | 7 | 25.209 | 3.5328 | 6 | 4 |
| 17 | 31.105 | 2.8753 | 120 | 89 | 18 | 32.290 | 2.7724 | 5 | 9 |
| 18 | 32.290 | 2.7724 | 53 | 51 | 8 | 25.476 | 3.4963 | 5 | 9 |

TABLE IV

X-RAY DIFFRACTION PATTERN OF EXAMPLE 4 PRODUCT
WAVELENGTH IN USE:
1.54184 AVERAGE BACKGROUND NOISE (CPM) = 22

| # | 2THETA | D | CPM | ESD | # | 2THETA | D | I | APPR. AREA |
|---|--------|---|-----|-----|---|--------|---|---|------------|
| 1 | 7.593 | 11.6428 | 376 | 148 | 8 | 22.557 | 3.9417 | 119 | 98 |
| 2 | 9.743 | 9.0779 | 83 | 63 | 1 | 7.593 | 11.6428 | 94 | 67 |
| 3 | 11.380 | 7.7756 | 14 | 0 | 6 | 19.913 | 4.4588 | 88 | 71 |
| 4 | 12.992 | 6.8141 | 55 | 58 | 7 | 21.192 | 4.1924 | 78 | 64 |
| 5 | 15.046 | 5.8883 | 136 | 93 | 9 | 26.110 | 3.4129 | 47 | 39 |
| 6 | 19.913 | 4.4588 | 352 | 149 | 11 | 30.212 | 2.9581 | 35 | 25 |
| 7 | 21.192 | 4.1924 | 315 | 146 | 5 | 15.046 | 5.8883 | 34 | 24 |
| 8 | 22.557 | 3.9417 | 478 | 178 | 10 | 29.210 | 3.0574 | 24 | 17 |
| 9 | 26.110 | 3.4129 | 191 | 111 | 2 | 9.743 | 9.0779 | 20 | 16 |
| 10 | 29.210 | 3.0574 | 98 | 82 | 4 | 12.992 | 6.8141 | 13 | 8 |
| 11 | 30.212 | 2.9581 | 140 | 92 | 3 | 11.380 | 7.7756 | 3 | 2 |

TABLE V

X-RAY DIFFRACTION PATTERN OF EXAMPLE 5 PRODUCT
WAVELENGTH IN USE:
1.54184 AVERAGE BACKGROUND NOISE (CPM) = 46

| # | 2THETA | D | CPM | ESD | # | 2THETA | D | I | APPR. AREA |
|---|--------|---|-----|-----|---|--------|---|---|------------|
| 1 | 7.503 | 11.7823 | 1503 | 312 | 1 | 7.503 | 11.7823 | 100 | 230 |
| 2 | 12.975 | 6.8229 | 195 | 105 | 6 | 22.507 | 3.9504 | 93 | 287 |
| 3 | 14.993 | 5.9091 | 494 | 176 | 4 | 19.876 | 4.4670 | 75 | 202 |
| 4 | 19.876 | 4.4670 | 1135 | 267 | 5 | 21.046 | 4.2212 | 62 | 190 |
| 5 | 21.046 | 4.2212 | 934 | 231 | 8 | 26.113 | 3.4125 | 36 | 97 |
| 6 | 22.507 | 3.9504 | 1405 | 291 | 3 | 14.993 | 5.9091 | 32 | 88 |
| 7 | 24.772 | 3.5941 | 75 | 65 | 10 | 30.243 | 2.9552 | 21 | 57 |
| 8 | 26.113 | 3.4125 | 543 | 178 | 9 | 29.122 | 3.0664 | 16 | 50 |
| 9 | 29.122 | 3.0664 | 249 | 128 | 2 | 12.975 | 6.8229 | 13 | 34 |
| 10 | 30.243 | 2.9552 | 320 | 139 | 11 | 33.768 | 2.6544 | 7 | 20 |
| 11 | 33.768 | 2.6544 | 110 | 80 | 7 | 24.772 | 3.5941 | 5 | 11 |

TABLE VI

X-RAY DIFFRACTION PATTERN OF EXAMPLE 6 PRODUCT
WAVELENGTH IN USE:
1.54184 AVERAGE BACKGROUND NOISE (CPM) = 21

| # | 2THETA | D | CPM | ESD | # | 2THETA | D | I | APPR. AREA |
|---|--------|---|-----|-----|---|--------|---|---|------------|
| 1 | 6.654 | 13.2831 | 22 | 7 | 2 | 7.434 | 11.8916 | 106 | 114 |
| 2 | 7.434 | 11.8916 | 640 | 203 | 7 | 22.433 | 3.9633 | 89 | 109 |
| 3 | 12.914 | 6.8552 | 81 | 76 | 5 | 19.800 | 4.4839 | 80 | 98 |
| 4 | 14.933 | 5.9325 | 198 | 107 | 6 | 20.994 | 4.2315 | 47 | 57 |
| 5 | 19.800 | 4.4839 | 480 | 176 | 8 | 26.030 | 3.4231 | 33 | 41 |
| 6 | 20.994 | 4.2315 | 283 | 134 | 4 | 14.933 | 5.9325 | 33 | 35 |
| 7 | 22.433 | 3.9633 | 534 | 176 | 10 | 30.161 | 2.9630 | 23 | 25 |

TABLE VI-continued

X-RAY DIFFRACTION PATTERN OF EXAMPLE 6 PRODUCT
WAVELENGTH IN USE:
1.54184 AVERAGE BACKGROUND NOISE (CPM) = 21

| # | 2THETA | D | CPM | ESD | # | 2THETA | D | I | APPR. AREA |
|---|--------|---|-----|-----|---|--------|---|---|------------|
| 8 | 26.030 | 3.4231 | 203 | 111 | 9 | 29.081 | 3.0706 | 16 | 17 |
| 9 | 29.081 | 3.0706 | 97 | 70 | 3 | 12.914 | 6.8552 | 13 | 14 |
| 10 | 30.161 | 2.9630 | 139 | 92 | 1 | 6.654 | 13.2831 | 3 | 3 |

It is claimed:

1. A method of preparing a silicoaluminophosphate composition comprising crystals having a framework topology from a forming mixture which comprises (i) preparing a mixture capable of forming said composition, said mixture comprising a source or sources of (a) an oxide of silicon, (b) an oxide of aluminum, and (c) an oxide of phosphorus, wherein said source or sources of (a) and (c) include(s) a reagent containing both phosphorus and silicon reactive sites in the same molecule, said molecule containing a silicon to carbon bond between a silicon atom and a phosphorus atom; and (ii) maintaining said mixture under conditions sufficient to form said composition, wherein said molecule is a phosphonate-functionalized organosiliconate.

2. The method of claim 1 wherein said molecule is a dialkylphosphatoalkyltrialkoxysilane.

3. The method of claim 2 wherein said molecule is diethylphosphatoethyltriethoxysilane.

4. The method of claim 1 wherein said silicoaluminophosphate composition is selected from the group consisting of SAPO-5 and SAPO-34.

5. The method of claim 1 wherein said silicoaluminophosphate composition is SAPO-5.

* * * * *